Patented Dec. 10, 1929

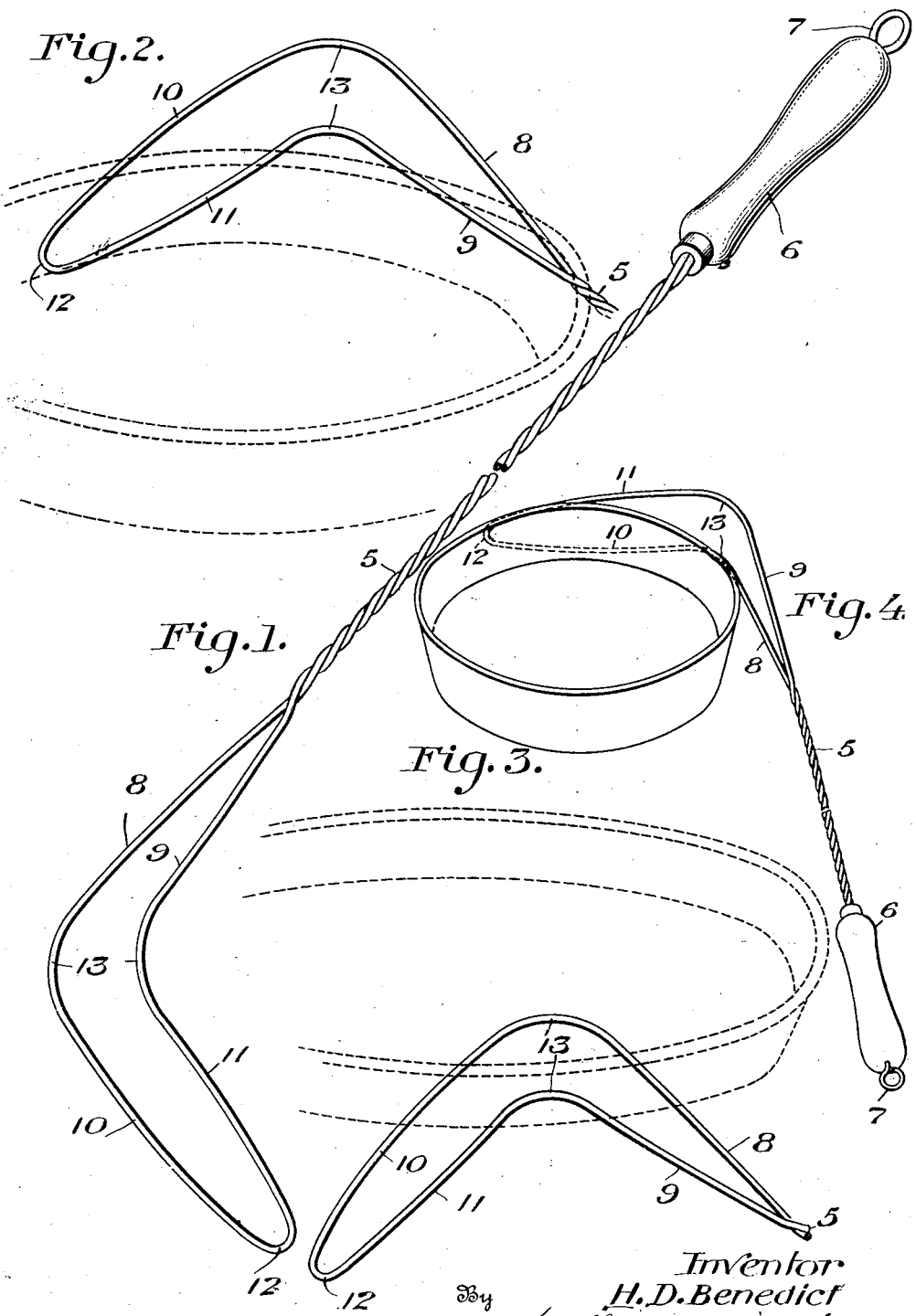

1,739,347

UNITED STATES PATENT OFFICE

HELEN DYMOND BENEDICT, OF BRIDGEPORT, CONNECTICUT

OVEN UTENSIL

Application filed August 14, 1928. Serial No. 299,608.

The present invention relates to improvements in oven utensils, and more particularly relates to a device for use in shifting the position of pans, or other food containers, in ovens without requiring the introduction of the hands of the operator into the oven, or subjecting the operator to liability to burns.

An object of the invention is to produce an improved tool having the purposes above described, in which the construction is simple and inexpensive, the manipulation easy and the uses thereof numerous in connection with the various cooking pots and vessels.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of an improved utensil constructed according to the present invention, Figure 2 is a fragmentary, perspective view of the operative end of the utensil shown in one position in connection with a pan illustrated in dotted lines, Figure 3 is a similar view showing a further use of the device, Figure 4 is a perspective view showing how the utensil goes around behind the pan.

Referring more particularly to the drawings, the device may be made from a single strand of heavy wire of round or other cross section. The wire is looped and its end portions brought together and twisted to produce the reinforced shank 5 which extends through the wooden or other handle 6. One terminal of the wire extends outwardly beyond the handle 6 and is rolled into the eye 7 for the purpose of hanging the utensil upon a convenient hook.

The operative end portion of the utensil consists of the legs 8, 9, 10, 11. The legs 8 and 9 merge at their inner ends with the twisted shank 5, while the legs 10 and 11 are connected, as indicated at 12, at their outer ends by the intermediate portion of the wire which forms the various legs. The legs 8 and 9 extend in the same direction with the axis of the shank 5 and handle 6, although they are gradually spread outwardly from the true axial line. The legs 10 and 11 extend at substantial right angles to the legs 8 and 9, the wire being bent as at 13; and the outer ends of the legs 10 and 11 converge to the connecting parts 12. These separated legs form a slot therebetween, the widest portion of which is preferably substantially at the bend 13. The end portions of the slot taper toward the connecting part 12 and toward the shank 5.

In the use of the device, the shank 5, possessing substantial length, enables the operative end of the utensil to be thrust to the back part of the oven, while the hand of the operator, gripping the handle 6, still remains without the oven. The hook, produced by the peculiar forms at the end of the utensil, enables the utensil to be engaged about a pot or pan for the purpose of turning the same or pulling such pot or pan toward the front of the oven, where it may be conveniently lifted out without injurious results to the housewife.

The pan may also be pushed back by simply inserting the legs 10 and 11 against the same, or the pan may be shifted from one side to the other of the oven by the manipulation of the utensil. By reversing the position of the utensils with respect to the pan or a lid thereof, as shown, for instance, in Figure 3, the convex portion of the curved part 13 may be first engaged with the utensil. In this way, the lid may be caught in the slot between the legs, the lid first entering the widest portion of the slot and the lid being gradually wedged into the convergent portions of the legs, so that the curved portion 13 of the handle goes toward the center of the lid or pan, while the legs extend out radially therefrom and thus grip substantial linear distances on the pan or lid in two divergent directions.

The tip end 12 may be also inserted within pans or containers for the purpose of shifting the same.

It will be obvious that many changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:

An improved kitchen utensil comprising a single strand of wire having its intermediate portion looped and bent to provide pairs of divergent legs disposed angularly toward one another, end portions twisted together, a handle extending about said twisted portion, and an eye beyond the handle for hanging the device.

HELEN DYMOND BENEDICT.